United States Patent
Boutnaru

(10) Patent No.: US 11,157,320 B2
(45) Date of Patent: Oct. 26, 2021

(54) OPTIMIZING RUNTIME ENVIRONMENTS

(71) Applicant: PayPal, Inc., San Jose, CA (US)

(72) Inventor: Shlomi Boutnaru, Modiin (IL)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/544,812

(22) Filed: Aug. 19, 2019

(65) Prior Publication Data

US 2020/0218575 A1 Jul. 9, 2020

Related U.S. Application Data

(63) Continuation of application No. 15/608,165, filed on May 30, 2017, now Pat. No. 10,387,205.

(51) Int. Cl.
| | | |
|---|---|---|
| G06F 9/50 | (2006.01) | |
| G06F 9/455 | (2018.01) | |
| H04L 29/06 | (2006.01) | |
| G06F 8/41 | (2018.01) | |
| H04L 29/08 | (2006.01) | |
| G06F 9/445 | (2018.01) | |
| G06F 11/30 | (2006.01) | |
| G06F 11/34 | (2006.01) | |
| G06N 3/12 | (2006.01) | |

(52) U.S. Cl.
CPC ............ *G06F 9/5027* (2013.01); *G06F 8/443* (2013.01); *G06F 9/445* (2013.01); *G06F 9/45516* (2013.01); *G06F 9/45525* (2013.01); *G06F 9/50* (2013.01); *G06F 9/5044* (2013.01); *G06F 9/5077* (2013.01); *G06F 11/30* (2013.01); *G06F 11/3466* (2013.01); *G06N 3/126* (2013.01); *H04L 67/02* (2013.01); *H04L 67/04* (2013.01); *H04L 67/101* (2013.01); *H04L 67/1004* (2013.01); *H04L 67/1025* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 8,954,309 B2 | 2/2015 | B'Far et al. | |
| 9,875,174 B1* | 1/2018 | Brandwine | G06F 11/3457 |
| 2011/0307899 A1* | 12/2011 | Lee | G06F 9/5027 |
| | | | 718/104 |
| 2015/0227448 A1* | 8/2015 | Goel | G06F 11/3466 |
| | | | 717/131 |
| 2016/0050108 A1* | 2/2016 | Baughman | G06F 11/3457 |
| | | | 709/220 |
| 2018/0018582 A1* | 1/2018 | Unsal | G06N 3/123 |

* cited by examiner

Primary Examiner — Lewis A Bullock, Jr.
Assistant Examiner — Mark A Gooray
(74) Attorney, Agent, or Firm — Haynes and Boone, LLP

(57) ABSTRACT

A system and method for optimizing runtime environments for applications by running the applications in a plurality of runtime environments and iteratively selecting and creating new runtime environments based on a fitness score determined for the plurality of runtime environments.

20 Claims, 3 Drawing Sheets

OPTIMIZING RUNTIME ENVIRONMENTS

CROSS-REFERENCE TO RELATED APPLICATION

This application is a continuation of U.S. patent application Ser. No. 15/608,165, filed May 30, 2017, entitled "Optimizing Runtime Environments," now issued U.S. Pat. No. 10,387,205 which is incorporated by reference in its entirety.

TECHNICAL FIELD

The present disclosure generally relates to optimizing runtime environments for applications.

BACKGROUND

Developers develop software applications in a development environment. The development environment is usually much more robust than necessary for running the software applications. Having a very robust development environment allows for developers to test and develop software applications without the software applications running into resource limitation issues. However, when deploying software applications on the eventual runtime environment, it would be inefficient and a waste to assign additional resources that are rarely used and/or unneeded by the software application. However, it is very difficult to determine an optimally efficient runtime environment. Different settings and different situations may change the amount of resources necessary. As such, runtime environments tend to be inefficient and overpowered. Applicant recognizes that a system for determining an optimized runtime environment would be beneficial.

Figure 1:
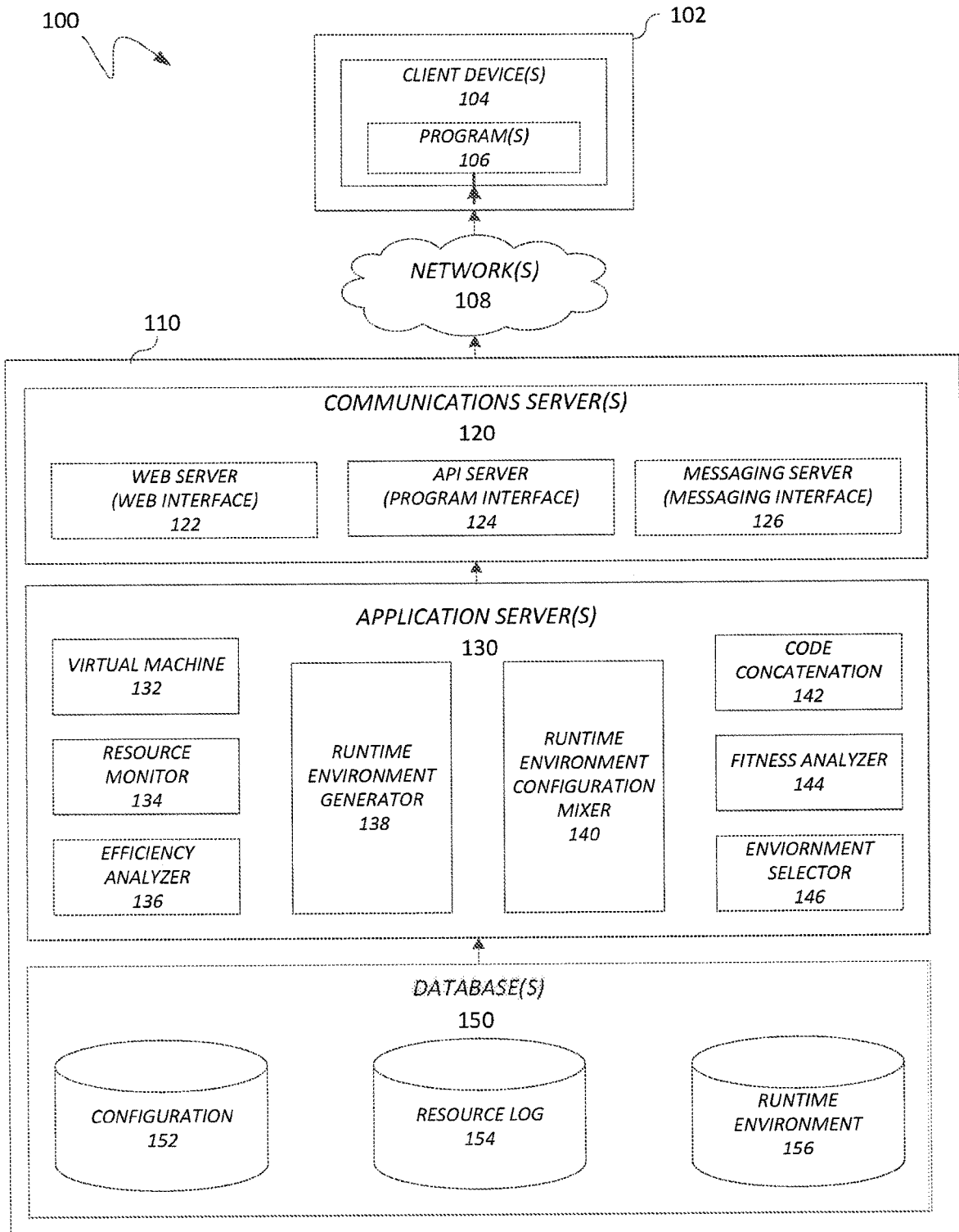
FIG. 1 is a block diagram of an example computing system that is adapted for optimizing runtime environments.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

FIG. 1 illustrates, in block diagram format, an example embodiment of a computing system adapted for implementing one or more embodiments disclosed herein to optimize runtime environments for applications. As shown, a computing system 100 may comprise or implement a plurality of servers, devices, and/or software components that operate to perform various methodologies in accordance with the described embodiments. Example servers, devices, and/or software components may include, for example, stand-alone and enterprise-class servers operating a operating system (OS) such as a MICROSOFT® OS, a UNIX® OS, a LINUX® OS, Symbian OS™, iOS, Android, Embedix OS, Binary Run-time Environment for Wireless (BREW) OS, JavaOS, a Wireless Application Protocol (WAP) OS and/or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, a server device, and/or any other computing device having computing and/or communications capabilities in accordance with the described embodiments. Client devices 104 may include a cellular telephone, smart phone, electronic wearable device (e.g., smart watch, virtual reality headset), and/or the like. In some examples, client devices 104 may be developer devices for developing applications.

Client devices 104 generally may include one or more programs 106, such as system programs and application programs to perform various computing and/or communications operations. Example system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, developer tools, new applications for development, emulation tools, web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN or LAN by sending and or receiving information via interaction with a website, web server, and/or the like. Any of a wide variety of suitable communication types between client devices 104 and system 110 may take place, as will be readily appreciated. In particular, wireless and wired communications of any suitable form may take place between client device 104 and system 110, such as that which often occurs in the case of networked devices and/or servers.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicates with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be a server that provides various services to client devices, such as runtime environment optimizations for certain applications. Application servers 130 may include multiple servers and/or components. For example, application servers 130 may include one or more virtual machines 132, resource monitor 134, efficiency analyzer 136, runtime environment generator 138, runtime environment configuration mixer 140, fitness analyzer 142, testing engine 144, and/or runtime environment selector 146. These servers and/or components, which may be in addition to other servers, may be structured and arranged to help protect devices against malware.

Application servers 130, in turn, may be coupled to and capable of accessing one or more databases 150 including configuration database 152, resource log database 154, and/or runtime environment database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
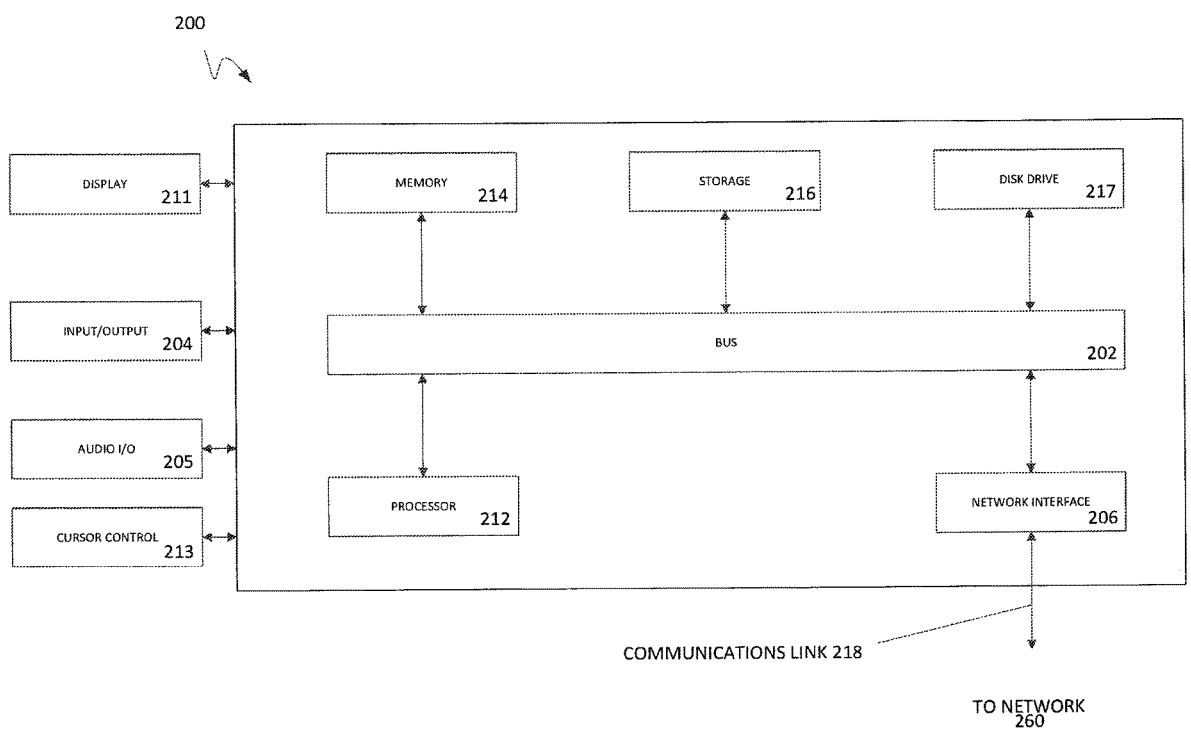
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider may utilize a network computing device (e.g., a server) capable of communicating with the network. It should be appreciated that each of the devices utilized by users, service providers, and/or the like may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touchscreen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal-oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer-readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
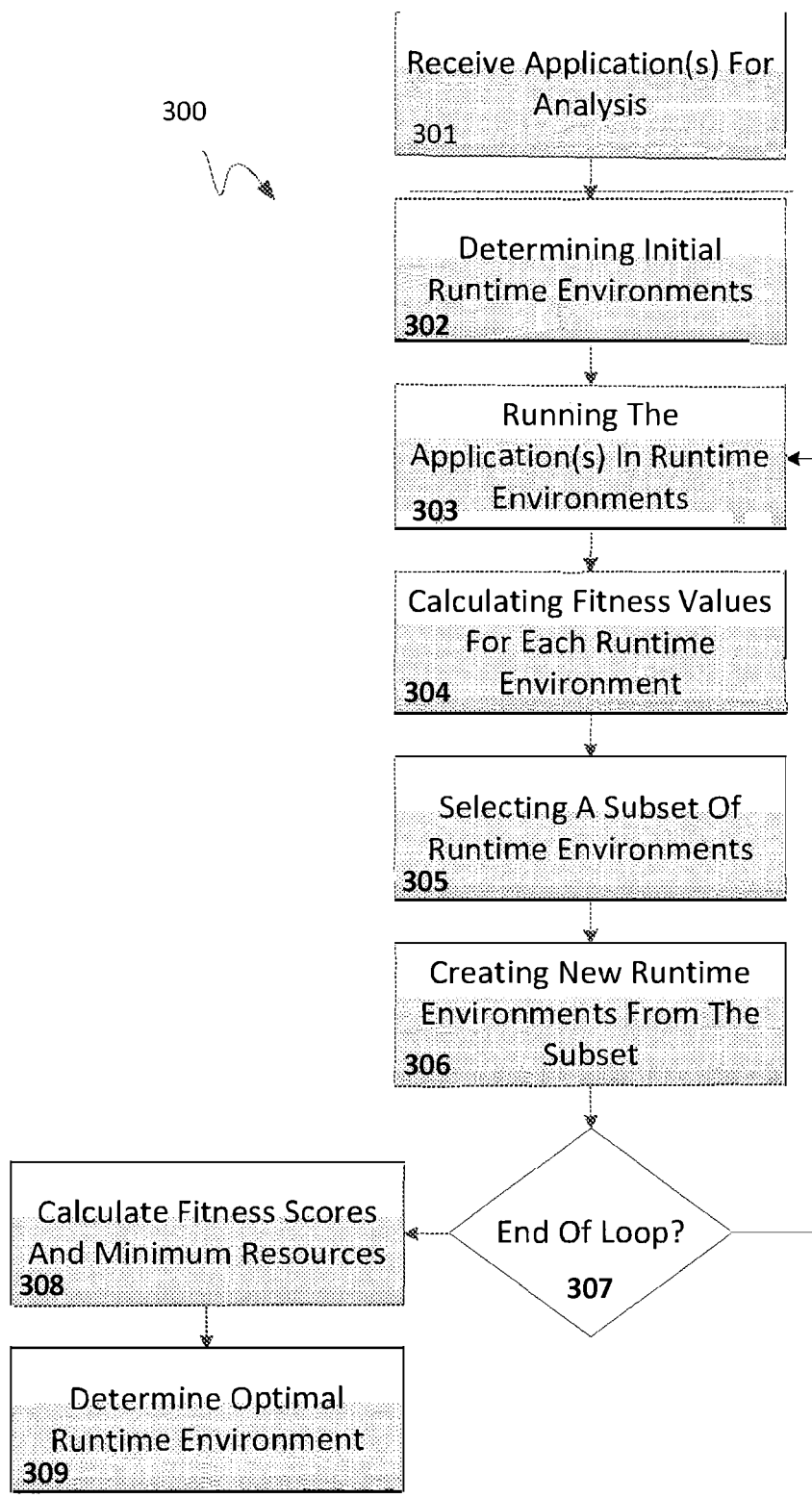
FIG. 3 is a flow diagram illustrating an example process for optimizing runtime environments.

FIG. 3 illustrates a flow diagram for an example runtime environment optimization process 300. Process 300 may be implemented on a system such as system 100 of FIG. 1 according to some embodiments. According to some embodiments, process 300 may include one or more of operations 301-309, which may be implemented, at least in part, in the form of executable code stored on a non-transitory, tangible, machine readable media that, when run on one or more processors, may cause a system to perform one or more of the operations 301-309.

At operation 301, the system may receive a request to determine an optimal server and/or runtime environment for one or more applications. The system may receive the applications for use in the runtime environment and/or one or more restrictions or parameters, such as the operating system used, hardware constraints (e.g. memory space, database space, and/or the like), and/or other restrictions. For example, before releasing a new application to the public, a user may want to optimize the runtime environment for use, and the user may use the system to provide configurations for an optimized runtime environment for one or more applications.

Process 300 may include operation 302. At operation 302, the system may determine one or more initial runtime environments for testing with the application received at operation 301 and use iteration to determine an optimized runtime environment. For example, the system may have one or more plurality of default settings for runtime environments to test applications on. In some examples, the system may have several runtime environment settings that the system may have determined for prior optimizations for other applications and saved in a database. In some examples, the system may randomly select settings for the runtime environment. In yet another example, the system may take a runtime environment with default settings and randomly add changes to the settings. Furthermore, the system may use a combination of the methods described above to generate a plurality of runtime environments to test with the applications received at operation 301. In some examples, each of the plurality of runtime environments may have unique settings from each other. Furthermore, the system may conduct operation 302 for several different engines that could be used for the runtime environment. In this manner, the system may optimize the runtime environments for multiple engines to help determine which engines are suitable for the one or more applications and/or what different optimizations could be made based on the engine.

Furthermore, this may help the system determine which engine is optimal for the one or more applications.

In some examples, the runtime environments may be run in a virtual machine emulating the environment. Furthermore, there may be some limitations on the resources available for the runtime environments due to the device running the virtual machine, the number of virtual machines, and/or the like. In some embodiments, the runtime environment may be run in a physical machine.

Process 300 may include operation 303. At operation 303, the system may set up one or more of the runtime environment and run the applications in the runtime environments with test data. For example, the system may setup a virtual machine with a runtime environment configuration selected from one of the plurality of runtime environments determined at operation 302. The configurations may include, but are not limited to, hardware specifications (e.g. processor speeds, number of processors, number of processor cores, memory (virtual and physical) size, disk space, disk speed, fs cluster size, and/or the like), I/O configurations (e.g. I/O cashe size, I/O max load, speed, and/or the like), network capabilities (e.g. number of ports, TCP/IP buffer sizes, flow control configurations, and/or the like), heap size, database configurations (e.g. data persistence settings, query optimization levels, buffpage, and/or the like), and/or other runtime environment settings.

With the runtime environment(s) up and running and the applications installed and running in the runtime environments, the system may attempt to emulate one or more loads using the test data for the applications running in the runtime environments. For example, the test data may be interactions specific for the applications, such as API calls, service requests, queries, use of libraries, and/or the like. The test data may be provided for the system to test with the applications. In some examples, the test data may be prerecorded in a database for use. In some examples, the test data may be splits from real time or near real time operations and queries for another application or runtime environment. As an example, there may be an older version of an application that is running live and in public and the application being tested through process 300 may be a newer version. As such, the system could fork and/or duplicate requests that are being conducted for the older application for use as test data for the new application in the runtime environment set up by process 300. In this manner the system can test the application and runtime environments using realistic test data.

Process 300 may include operation 304. At operation 304, the system may measure one or more attributes of the runtime environment and determine one or more fitness values for each runtime environment. For example, the system may monitor, for optimization, resources that include, but are not limited to, memory allocation (virtual and/or physica), paged pool, non-paged pool, data storage used, count of read bytes, count of write bytes, latency in read, latency in write, number of network connections, count of network read bytes, count of network write bytes, network latency for read and/or write, CPU usage (mininum and/or maximum), CPU usage time, CPU time in user mode, CPU time in kernel mode, user response times, size of stack, size of heap, minimum number of processes, maximum number of processes, minimum number of file descriptors, maximum number of file descriptors, CPU affinity configuration, lengths of time associated with resources usages, and/or the like. The system may also measure values associated with the application, such as response times, error rates, and/or the like.

The system may determine averages for the characteristics, and/or other statistical representations, such as frequency of certain characteristics. For example, frequency of CPU usage below a certain threshold and/or above a certain threshold.

Furthermore, the system may determine one or more fitness values for each of the different runtime environments based on the individual statistical values measured while running the applications in the runtime environment. In some examples, the aggregated statistical values in combination may be used as the fitness values. In some examples, the system may determine one or more representative values associated with the fitness of the runtime environment. The fitness may be for resource efficiency while still capable of optimal performance of the applications. In some examples, the system may be configured to balance efficiency with performance. An example of high efficiency for a CPU resource would be when the CPU is used at 100% all the time. However, this may be an example of high efficiency, but poor performance due the CPU being too slow. In contrast, a resource may allow for optimal performance but may be highly inefficient. For example, if a maximum of 1 mb of memory is used by a system that has 10 gb of memory, this would clearly be highly inefficient. These examples can be applied to many other resources, such as buffer size, heap size, data rate, bandwidth, and/or the like, all of which the process 300 may be optimizing for.

In some examples, a user may provide some optimizations parameters that the system may use as constraints as part of the optimization and fitness determination. For example, a user may request that one or more resources, such as the CPU, not be used above 90% for over a certain time period. In some examples, the optimization parameters may be a goal associated with an application, such as to optimize the system for the shortest response times for the applications run in the runtime environment. In some examples, the optimization may be to ensure a resource is used above a threshold value, or that speeds are not a below a certain level, or not below a certain level for a % of time and/or for a length of time. The fitness score determined by the system may be based at least in part on the performance of the runtime environments against the user provided constraints. In some examples, the system may attempt to optimize the system without constraints.

In some examples, the system may optimize performance and maximizing efficiency at the same time. The system may use averages and/or comparisons of statistical values of the different runtime environments measured to determine whether performance has been maximized and/or whether efficiency has been maximized. For example, the system may compare memory usage and determine that memory was not used above a certain amount, that additional CPU speed did not change response times, and/or the like. The system may maintain a record of maximum and minimum values tested from the different runtime environments as examples of optimal performance and/or optimal efficiency.

In some examples, the system may determine efficiency values, performance values, and/or a combination value runtime environments based on the statistics gathered during the run in operation 303. In some examples the values may be based on deviations from the average of all the runtime environments. In some examples, the values may be based on deviations from a maximum or a minimum. In some examples, the values may be based on deviations from user constraints. In some examples, the system may aggregate the values (some of the values may be weighted differently) to determine fitness scores for each of the runtime environments for ranking.

Process 300 may include operation 305. At operation 305, the system may select a subset of runtime environments run at operation 303. In some examples, the system may select a predetermined number or percentage of runtime environments with the best fitness scores determined at operation 304. In some examples, one or more runtime environments may be selected at random to add diversity. In some examples, one or more runtime environments may be selected based on extreme values, such as the fastest response time, least CPU usage, most CPU usage, and/or the like. In some examples, the system may use a combination of methods to select the subset of runtime environments.

Process 300 may include operation 306. At operation 306, the system may implement one or more genetic or evolution algorithm techniques on the subset of runtime environments selected at operation 305 to create a new set of runtime environments. For example, the system may mix two or more runtime environment configurations and/or apply one or more mutations on one or more runtime environments.

In some examples, the system may apply a cross over technique on two or more runtime environments. For example, the system may have two runtime environments trade half of the configurations. The crossover points may be predetermined, selected at random, or selected using one or more algorithms. In some examples the cross over point may determine how much of a runtime environment changes. In some examples, the system may set the change to a predetermined percentage of change. For example, having 20% of the configurations on a runtime environment change, and 80% kept the same. In some examples, the system may apply the partially matched crossover technique, where two crossover points are selected at random.

Other crossover techniques may be used in combination or instead. For example, the system may use cycle cross over where every Nth configuration is replaced with a configuration from another runtime environment in the subset determine at operation 305. N may be predetermined. For example, if N was 2, every other configuration would be switched.

In some examples, the system may use one or more other cross over operations, such as order-based cross over, position-based crossover, voting recombination crossover, alternating-position cross over, sequential constructive cross over, and/or the like. In this manner, the system may attempt to create a better or more optimized runtime environment by merging the runtime environments that had the better fitness scores.

Furthermore, the system may mutate one or more of the configurations for the runtime environments, sometimes before a crossover and/or sometimes after. The system may implement one or more methods of mutations. For example, the system may randomly replace a configuration with a upper or lower boundary. In some examples, the system may increase or decrease a random configuration value. In some examples, the system may apply a random value for one or more random configuration settings. In this manner, additional diversity of configuration is maintained. In some examples, the amount of mutation may be predetermined and/or provided by a user. For example, maybe only a subset of the subset of runtime environments may be mutated, and the mutations may be limited to a predetermine percentage of configurations.

Operation 306 may result in a plurality of additional runtime environments derived from the subset determined at operation 305. The additional runtime environments may be a combination and/or mutations from the subsets.

In some examples, process 300 may include operation 307. At operation 307, the system may determine whether the genetic algorithm and/or evolutionary process for determining the optimal configuration of the runtime environments for the applications in operation 301 has been performed a sufficient number of times. In some examples, there may be a predetermine number of genetic algorithm iterations/generations that the system goes through. In some examples, genetic algorithm iterations may be characterized by a set of operations that can be repeated in a feedback loop as part of an evolution using a genetic algorithm, such as one or more of operations 303-306. In some examples, the user may determine the number of genetic algorithm iterations. In some examples, the numbers of genetic algorithm iterations may be hard coded. In some examples, the system may determine the number of genetic algorithm iterations to perform based on the number of runtime environments were used to initiate the genetic algorithm iterations.

In some examples, the system may determine whether enough genetic algorithm iterations have been conducted based on how much change to the fitness scores occurs between genetic algorithm iterations. For example, if the delta between fitness scores is zero (or other threshold delta value) for a genetic algorithm iteration and/or a predetermined number of genetic algorithm iterations, the system may determine that the genetic algorithm iterations should end. In some examples, the threshold delta may depend on an average change in delta from previous genetic algorithm iterations. In this manner, the system does not unnecessarily continue testing and creating new runtime environments to obtain the optimal solution, when the optimal solution may have already been achieved.

If the system determine that additional genetic algorithm iterations should be performed, the system may continue to operation 303 using the new runtime environments as input for testing the applications at operation 303.

If the system determines that additional genetic algorithm iterations are not required, the system may continue to operation 308, wherein the fitness scores of the newly determined runtime environments at operation 305 are calculated. In some examples, the system may obtain the fitness scores in a similar manner as operations 303 and 304.

Process 300 may include operation 309, wherein the system selects one of the runtime environments with the best fitness score as the optimal runtime environment.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure.

Having thus described embodiments of the present disclosure, persons of ordinary skill in the art will recognize that changes may be made in form and detail without departing from the scope of the present disclosure. Thus, the present disclosure is limited only by the claims.

What is claimed is:
1. A system, comprising:
a non-transitory memory storing instructions; and
one or more hardware processors coupled to the non-transitory memory and configured to execute the instructions from the non-transitory memory to cause the system to perform operations comprising:

executing an application in a current runtime environment as part of a current iteration of a runtime environment optimization;

calculating, based on the execution, a current fitness score for the current runtime environment, wherein the current fitness score is calculated based on aggregating calculated current fitness values that measure a relationship between a computer resource usage and a response time of the application and determining that central processing unit (CPU) usage satisfies a constraint of a maximum CPU usage over a certain time period, and wherein the computer resource usage comprises a CPU usage;

determining that the calculated current fitness score has a delta change from a previous fitness score for a previous runtime environment that does not meet a threshold delta value, wherein the previous runtime environment was part of a previous iteration of the runtime environment optimization; and in response to the determining that the calculated current fitness score has a delta change from the previous fitness score that does not meet the threshold delta value, generating a next runtime environment as a modification of the current runtime environment for an execution of the application during a next iteration of the runtime environment optimization, wherein the next runtime environment is generated to have a predefined percentage of settings modified from settings of the current runtime environment;

repeating the executing, the calculating, the determining, and the generating operations until the delta change between the calculated current fitness score and the previous fitness score for the previous runtime environment meets the threshold delta value; and selecting the previous runtime environment as a final configuration for the runtime environment optimization in response to the delta change between the calculated current fitness score and the previous fitness score for the previous runtime environment meeting the threshold delta value.

2. The system of claim 1, wherein the computer resource usage further comprises at least one of a CPU load a memory load, or a network load.

3. The system of claim 1, wherein the application is executed in a virtual machine (VM) emulating the current runtime environment.

4. The system of claim 1, wherein a configuration of the current and the next runtime environment includes at least one of hardware specifications, input/output configurations, network capabilities, a heap size, or database configurations.

5. The system of claim 1, wherein the next runtime environment is generated using one or more genetic algorithm techniques that include a random configuration of the current runtime environment being changed to generate the next runtime environment.

6. The system of claim 1, wherein the maximum CPU usage is ninety percent.

7. The system of claim 1, wherein the computer resource usage further comprises an amount of memory allocated to the application executing in the current runtime environment.

8. The system of claim 1, wherein the operations further comprise determining that the current fitness score is further calculated based on aggregating a current fitness value for satisfying a constraint of a maximum response time for the application executing in the current runtime environment.

9. A computer implemented method, comprising:

executing an application in a current runtime environment as part of a current iteration of a runtime environment optimization;

calculating, based on the execution, a current fitness score for the current runtime environment, wherein the current fitness score is calculated based on aggregating calculated current fitness values that measure a relationship between a computer resource usage and a response time of the application and determining that central processing unit (CPU) usage satisfies a constraint of a maximum CPU usage over a certain time period, and wherein the computer resource usage comprises a CPU usage;

determining that the calculated current fitness score has a delta change from a previous fitness score for a previous runtime environment that does not meet a threshold delta value, wherein the previous runtime environment was part of a previous iteration of the runtime environment optimization;

in response to the determining that the calculated current fitness score has a delta change from the previous fitness score that does not meet the threshold delta value, generating a next runtime environment as a modification of the current runtime environment for an execution of the application during a next iteration of the runtime environment optimization, wherein the next runtime environment is generated to have a predefined percentage of settings modified from settings of the current runtime environment;

repeating the executing, the calculating, the determining, and the generating steps until the delta change between the calculated current fitness score and the previous fitness score for the previous runtime environment meets the threshold delta value;

selecting, in response to the delta change between the calculated current fitness score and the previous fitness score meeting the threshold delta value, the previous runtime environment as a final configuration for the runtime environment optimization.

10. The method of claim 9, wherein the computer resource usage further comprises at least one of a CPU load, a memory load, or a network load.

11. The method of claim 9, wherein the application is executed in a virtual machine (VM) emulating the current runtime environment.

12. The method of claim 9, wherein a configuration of the current and the next runtime environment includes at least one of hardware specifications, input/output configurations, network capabilities, a heap size, or database configurations.

13. The method of claim 9, wherein the next runtime environment is generated using one or more evolution algorithm techniques that include a configuration of the current runtime environment being increased or decreased to generate the next runtime environment.

14. The method of claim 9, wherein the maximum CPU usage is ninety percent.

15. A non-transitory machine-readable medium having stored thereon machine-readable instructions executable to cause the machine to perform operations comprising:

executing an application in a current runtime environment as part of a current iteration of a runtime environment optimization;

calculating, based on the execution, a current fitness score for the current runtime environment, wherein the current fitness score is calculated based on aggregated calculated current fitness values that measure a relationship between a computer resource usage and a response time of the application and determining that central processing unit (CPU) usage satisfies a constraint of a maximum CPU usage over a certain time period, and wherein the computer resource usage comprises a CPU usage;

determining that the calculated current fitness score has a delta change from a previous fitness score for a previous runtime environment that does not meet a threshold delta value, wherein the previous runtime environment was part of a previous iteration of the runtime environment optimization; and in response to the determining that the calculated current fitness score has a delta change from the previous fitness score that meets the threshold delta value, generating a next runtime environment as a modification of the current runtime environment for an execution of the application during a next iteration of the runtime environment optimization, wherein the next runtime environment is generated to have a predefined percentage of settings modified from settings of the current runtime environment;

repeating the executing, the calculating, the determining, and the generating operations until the delta change between the calculated current fitness score and the previous fitness score for the previous runtime environment meets the threshold delta value;

selecting the previous runtime environment as a final configuration for the runtime environment optimization in response to the delta change between the calculated current fitness score and the previous fitness score meeting the threshold delta value.

16. The non-transitory machine-readable medium of claim 15, wherein the computer resource usage further comprises at least one of a CPU load, a memory load, or a network load.

17. The non-transitory machine-readable medium of claim 15, wherein the application is executed in a virtual machine (VM) emulating the current runtime environment.

18. The non-transitory machine-readable medium of claim 15, wherein a configuration of the current and the next runtime environment includes at least one of hardware specifications, input/output configurations, network capabilities, a heap size, or database configurations.

19. The non-transitory machine-readable medium of claim 15, wherein the threshold delta value is zero.

20. The non-transitory machine-readable medium of claim 15, wherein the maximum CPU usage is ninety percent.

* * * * *